(12) United States Patent
Bosnjak et al.

(10) Patent No.: US 9,200,683 B2
(45) Date of Patent: Dec. 1, 2015

(54) RELEASE DEVICE

(71) Applicant: Schaeffler Technologies GmbH & Co. KG, Herzogenaurach (DE)

(72) Inventors: Daniel Bosnjak, Seltz (FR); Luben Krahtov, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 28 days.

(21) Appl. No.: 14/146,191

(22) Filed: Jan. 2, 2014

(65) Prior Publication Data

US 2014/0182994 A1 Jul. 3, 2014

Related U.S. Application Data

(63) Continuation of application No. PCT/DE2012/000636, filed on Jun. 21, 2012.

(30) Foreign Application Priority Data

Jul. 11, 2011 (DE) .......................... 10 2011 107 070

(51) Int. Cl.
*F16D 25/08* (2006.01)

(52) U.S. Cl.
CPC .............. *F16D 25/08* (2013.01); *F16D 25/083* (2013.01)

(58) Field of Classification Search
None
See application file for complete search history.

(56) References Cited

U.S. PATENT DOCUMENTS

| | | | | |
|---|---|---|---|---|
| 2003/0010595 | A1* | 1/2003 | Heller | 192/85 CA |
| 2008/0116031 | A1 | 5/2008 | Rammhofer | |
| 2011/0048887 | A1* | 3/2011 | Diemer et al. | 192/48.618 |
| 2011/0094845 | A1* | 4/2011 | Hogberg et al. | 192/48.61 |
| 2011/0233025 | A1* | 9/2011 | Heitbaum | 192/85.01 |

FOREIGN PATENT DOCUMENTS

| | | | |
|---|---|---|---|
| CN | 101395397 A | | 3/2009 |
| DE | 102010035137 | | 5/2011 |
| EP | 0185176 | | 5/1986 |
| EP | 1887242 | | 2/2008 |
| GB | 2 288 862 A | * | 11/1995 |
| WO | 2006047981 | | 5/2006 |
| WO | 2007101419 A | | 9/2007 |
| WO | 2011103894 | | 9/2011 |

* cited by examiner

Primary Examiner — Rodney H Bonck
(74) Attorney, Agent, or Firm — Volpe and Koenig, P.C.

(57) ABSTRACT

A release device for a friction clutch, including an actuator for axially actuating the friction clutch, the actuator being designed to be hydraulically actuated by a fluid, and a support element having an integrated securing point for supporting the actuator on a clutch bell. An axial connection for the hydraulic fluid can be provided in the support element. The invention also relates to the possibility of designing the support element as a single piece with the housing of the actuator.

8 Claims, 5 Drawing Sheets

RELEASE DEVICE

INCORPORATION BY REFERENCE

The following documents are incorporated herein by reference as if fully set forth: International Application No. PCT/DE2012/000636, filed Jun. 21, 2012, and German Patent Application No. DE 102011107070.6, filed Jul. 11, 2011.

BACKGROUND

The invention relates to a release device. In particular the invention relates to a release device for axially actuating a friction clutch.

A friction clutch is used between a driving engine and a transmission of a motor vehicle, for example a lamella clutch operating in an oil bath, comprising a plurality of steel and friction lamellae, with one type of lamellae each being connected in a torque-proof fashion to a driven shaft of the driving engine and/or a drive shaft of the transmission. The lamellae are arranged alternating in the axial direction and are pressed against each other via a spring force such that here a friction-fitting connection develops, which connects the driven shaft of the driving engine with the drive shaft of the transmission in a torque-proof fashion. In order to release the lamellae clutch a release bearing is operated opposite the direction of force of the spring so that the friction-fitting connection between the lamellae is released and the torque-proof connection between the driven shaft and the drive shaft is interrupted.

Different embodiments of release devices are known for axially operating the release bearing. In one embodiment a hydraulic actuator is used, which is arranged annularly around the driven shaft of the driving engine. In a transmission with a dual clutch accordingly two lamellae clutches are installed, which can be operated independent from each other by hydraulic release devices arranged concentrically about the driven shaft of the driving engine.

SUMMARY

There is a need for a release device for a friction clutch with an improved assembly option to be used at a modern transmission under restricted spatial conditions.

This objective is obtained via a release device having one or more features of the invention. The preferred embodiments are described below and in the claims.

A release device according to the invention for a friction clutch comprises an actuator for axially actuating the friction clutch, with the actuator being implemented for hydraulic operation via a fluid, and a support element with an integrated securing point for supporting the actuator at a clutch bell. Here, an axial connection for the hydraulic fluid may be provided in the support element. Within the scope of the invention the option also develops to embody the support element in one piece with a housing of the release device. This way, in such an embodiment the housing forms a carrier housing.

The support element can therefore meet the objective of securing the release device at the clutch bell and simultaneously the guidance of the fluid. The release device can therefore be produced in an easier and more cost effective fashion. The fastening of the support element can lead to a separate assembly part, such as a clamping claw, becoming unnecessary. The fluid connection between the axial hydraulic connection and the corresponding hydraulic connection in the clutch bell can be established automatically during an assembly of the release device at the clutch bell.

Radial distances of the securing points from an axis of rotation of the friction clutch may be located outside a radial circumference of the friction clutch. This way, the clutch bell can be assembled when the friction clutch is already placed on the release device in the axial direction. This way, the release device can be assembled together with the friction clutch as a separately handled unit and perhaps be designed integrated with it. Such an arrangement of the release device is also called "cover-tight".

In a preferred embodiment the release device is further embodied to release another friction clutch, independent from the other friction clutch, with the support element comprising another axial connection for fluids.

In a preferred embodiment the carrier element comprises an axial contact area for contacting the clutch bell in the area of the axis of rotation and the support element is shaped such that the securing points are axially separated each by a predetermined gap from the clutch bell when the contact area contacts the clutch bell such that the carrier element can be pre-stressed axially by approaching the securing points at the clutch bell in order to connect the axial connections in a fluid-tight fashion.

By pre-stressing the support element in the proximity of the axial connections it can be ensured that the connections are even fluid-tight when the fluid is pressurized in order to release one of the friction clutches so that the hydraulic pressure tends to axially distance the support element from the clutch bell.

In a preferred embodiment an axial spring element is provided for connecting the securing points with the clutch bell. The spring element is here designed such that it ensures that the predetermined pre-stressing of the support element is maintained and/or not exceeded.

In one embodiment the support element is embodied in one piece and comprises both the connections as well as the securing points and/or connection elements to the securing points. In another embodiment the support element comprises a hydraulic connection element to accept the connections and an essentially disk-shaped connection element, fastened at the connection element, to be fastened at the clutch bell.

The disk-shaped connection element can be produced in a cost-effective fashion, for example from sheet metal. The connection element may be formed from a light metal or from steel. Securing points may be provided both at the connector element as well as the connection element so that the connector element may be embodied in a compact and material-saving fashion, while the connection element can be sized weakly, because not all fastening forces of the connector element are guided through the connection element. This way production costs can be reduced.

By the separate connection element the construction space and/or the weight of the release device can be reduced. Further, savings can be achieved during the production of the release device.

In one embodiment a fitting device is provided to ensure an unambiguous rotational position of installation of the support element. This can prevent any faulty allocation and/or blockage of one of the hydraulic connections.

Adjacent angles between the securing points may be different from each other with regards to the axis of rotation. This way here a rotational position of installation of the support element and/or the connection element can be ensured.

Preferably the support element comprises a radial contact area for contacting the clutch bell in the proximity of the axis of rotation in order to ensure centering of the release device in reference to the clutch bell. A position of installation of the release device can this way be largely predetermined so that any play of installation can be reduced and a false position of installation can be prevented.

BRIEF DESCRIPTION OF THE DRAWINGS

The invention is now explained in greater detail with reference to the attached figures. Shown are.

DETAILED DESCRIPTION OF THE PREFERRED EMBODIMENTS

Figure 1:
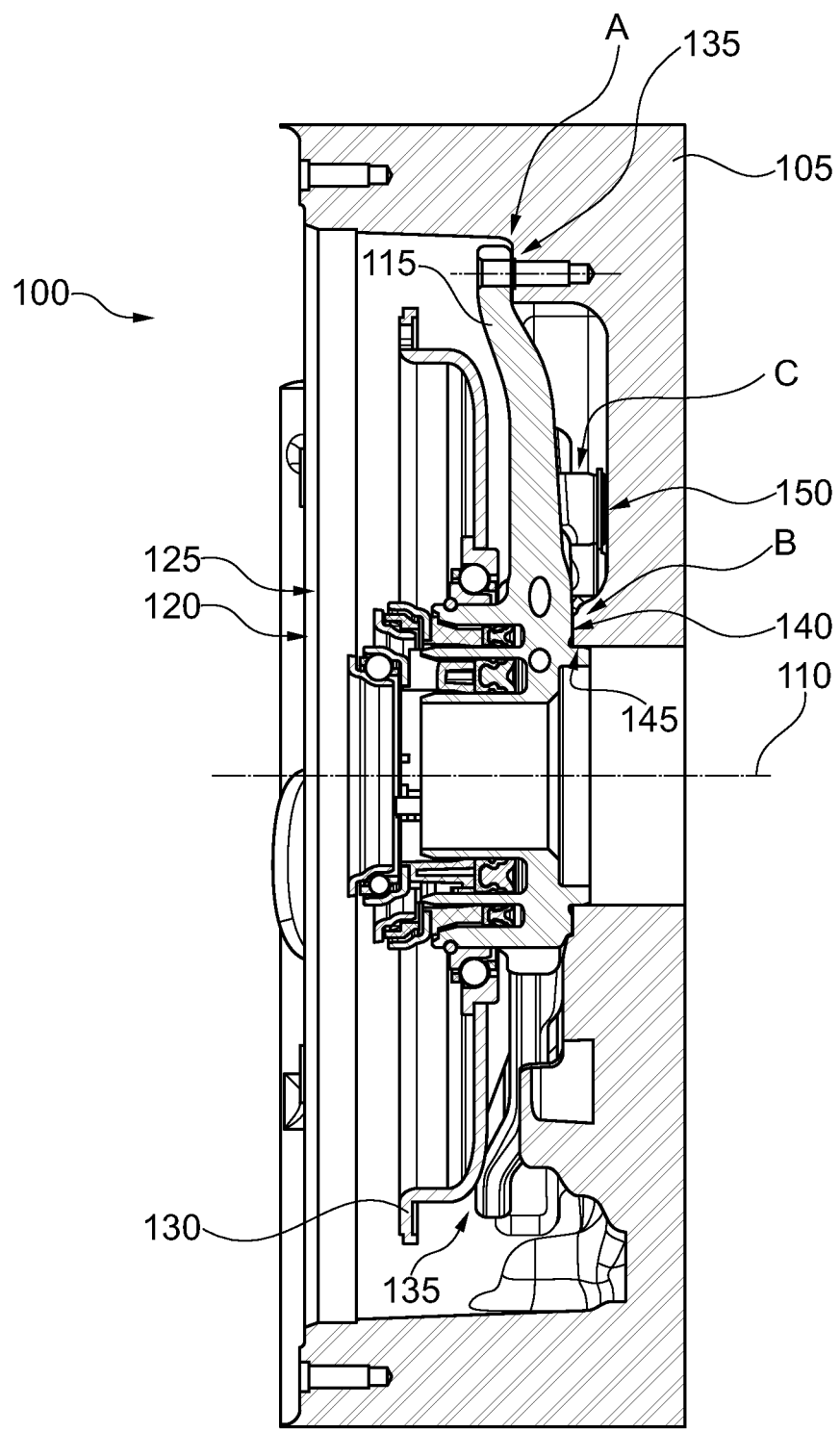
FIG. 1 is a longitudinal cross-sectional view through a release device.

FIG. 1 shows a longitudinal cross-section through a release device 100. The release device 100 is shown in the assembled state in a clutch bell 105. Two friction clutches, particularly lamellae clutches operating in an oil bath, which can be axially actuated and/or released independent from each other via the release device 100, follow the release device 100 towards the left and are not shown.

The clutch bell 105 represents a cup-shaped recess in the housing of an engine, particularly an internal combustion engine for driving a motor vehicle. The internal combustion engine extends from FIG. 1 towards the right. A driven shaft of the internal combustion engine (not shown) extends from the side of the internal combustion engine towards the left through the release device 100 to the lamellae clutches. The lamellae clutches, the driven shaft, and parts of the release device 100 are arranged rotationally about an axis of rotation 110.

The release device 100 comprises a support element 115, which is embodied in one piece with the housing of the release device 100, a first hydraulic actuator 120, a second hydraulic actuator 125, and a clutch support 130. The support element 115 is preferably produced from a light-metal cast part. The support element 115 comprises several securing points 135, with one of them being shown in greater detail in the area A in FIG. 2, an axial contact area 140, and a radial contact area 145 in the area B, which is shown in greater detail in FIG. 3, and hydraulic connector elements 150 in the area C, which are shown in greater detail in FIG. 4. The securing points 135 are located, with regards to the axis of rotation 110, at distances exceeding a radius of the clutch support 130 such that the release device 100 at the clutch bell 105 can be fastened when the clutch support 130 is already fastened at the support element 115.

The hydraulic actuators 120 and 125 are arranged concentrically about the axis of rotation 110. Each of the hydraulic actuators 120, 125 is embodied to apply a force, acting towards the left opposite the clutch bell 105 when a hydraulic pressure is generated in a corresponding hydraulic supply line. The force of each hydraulic actuator 120, 125 acts against a spring force of the corresponding lamellae clutch, which stressed the respective clutch in the axial direction and this way generates a force-fitting connection. When operating one of the actuators 120, 125 the spring load is released and/or the lamellae or friction disks are separated from each other in the axial direction so that the force-fitting connection is released.

The clutch support 130 is designed to form a counter-bearing for one or both of the lamellae clutches. For example, tension springs, which compress one of the lamellae clutches in the axial direction, may be connected at their right end to the clutch support 130. The clutch support 130 is rotationally fastened via a roller bearing, preferably a separable ball bearing, at the support element 115.

Figure 2:
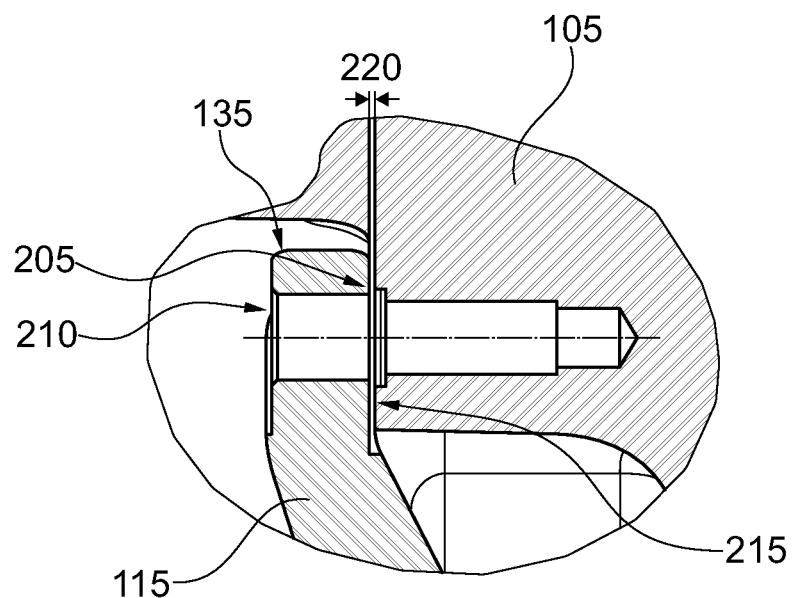
FIGS. 2 to 4 are detail views of a release device of FIG. 1.

FIG. 2 shows a detail of the release device 100 of FIG. 1 in the area A indicated there. The detail shown illustrates a fastening of the upper securing point 135 at the clutch bell 105.

The securing point 135 is formed by a contact area 205 of an extension of the support element 115 and a recess 210 to accept a bolt (not shown) extending through the contact area 205. The contact area 205 of the support element 115 is provided for contacting a contact area 215 of the clutch bell 105. The support element 115 is shaped however such that it already contacts the clutch bell 105 in the axial direction in the proximity of the axis of rotation 110 before the contact areas 205 and 215 contact each other. Accordingly, initially a gap 220 forms between the contact areas 205 and 215. By screwing the bolt through the recess 210 towards the right into the clutch bell 105 the contact areas 205 of the support elements 115 and 215 of the clutch bell 105 can approach each other in the axial direction, with the support element 115 being subjected to axial pre-stressing.

Figure 3:
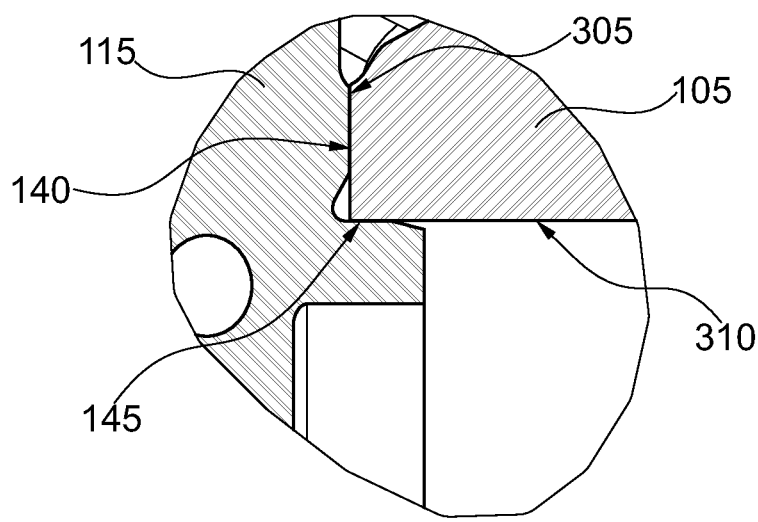

FIG. 3 shows another detail of the release device 110 of FIG. 1 in the area B indicated there. The detail shows contact areas between the support element 115 and the clutch bell 105 in the proximity of the axis of rotation 110.

The axial contact area 140 of the support element 115 contacts the clutch bell 105 at an axial contact area 305. This contact prevents any further motion of the support element 115 towards the right, resulting in a gap 220 forming in FIG. 2 as long as the support element 115 is free from tension, i.e. it is supported without any stress towards the right in the area of the securing point 135.

The radial contact area 145 of the support element 115 contacts a radial contact area 310 of the clutch bell 105. Here, the contact areas 145 and 310 are circumferential about the axis of rotation 110 so that the release device 100 is centered about the axis of rotation 110 with regards to the clutch bell 105.

Figure 4:
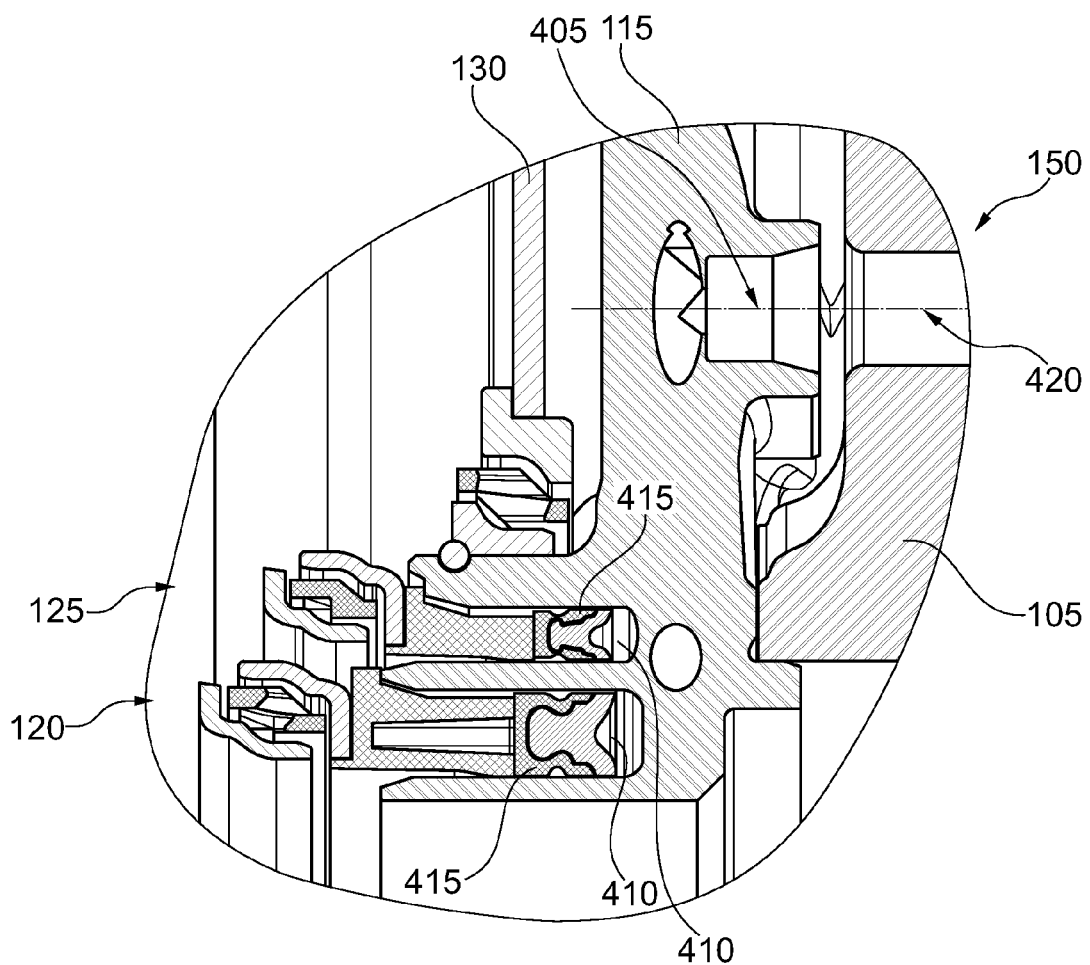

FIG. 4 shows another detail of the release device 100 of FIG. 1 in the area C indicated there. The detail shows a hydraulic connector element 150 of the release device 100.

The hydraulic adapter 150 is allocated to one of the hydraulic actuators 120, 125. A first channel 405 extends within the support elements 115 in a direction parallel in reference to the axis of rotation 110. Additional channels within the support element 115, not shown in their entirety, connect the first channel 405 to a cylinder 410 of one of the actuators 120, 125. The cylinders 410 are formed like rings and/or toruses about the axis of rotation 110. Corresponding hollow-cylindrical pistons 415 are received in the cylinders, 410, movable towards the left, and seal the cylinders 410 towards the left in a fluid-tight fashion.

A second channel 420, extending within the clutch bell 105, is aligned axially opposite the first channel 405. Opposite ends of the channels 405 and 420 are each conically widened. Optionally an elastic seal (not shown) is provided, for example an O-ring, in an area inside the conical expansions and between ends of the channels 405 and 420 located opposite each other. This way a fluid-tight connection is established between the piston 410 of the respective actuator 120, 125 and the second channel 420 of the clutch bell 105. The second channel 420 may particularly be connected to a hydraulic control device, which is implemented to select gears in a transmission connected to the clutches, which can be operated via the actuators 120, 125.

When a fluid pressure in the second channel 420 is increased here a force develops, which tends to move the support element 115 towards the left away from the clutch bell 105. By the pre-stressing of the support element 115 at the securing points 135 this force is supported in such a fashion that a seal is ensured in the area of the connector element 150.

Figures 5A, 5B:
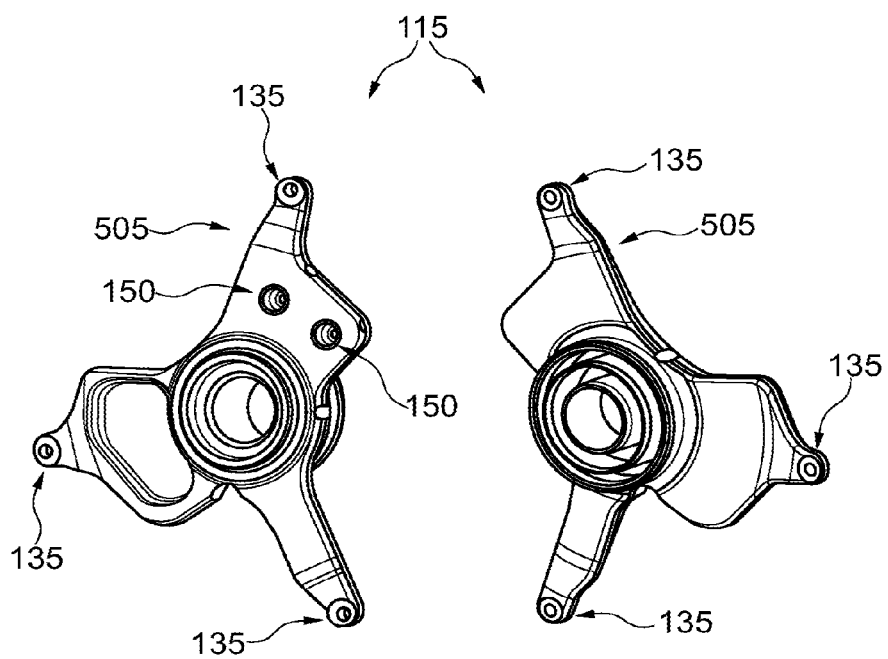
FIGS. 5A and B are perspective views of a support element of a release device according to FIGS. 1 to 4.

FIGS. 5A and 5B show perspective views of the support element 115 of the release device 100 according to FIGS. 1 to 4. The left illustration in FIG. 5A shows a surface facing the clutch bell 105, while the right illustration in FIG. 5B shows a side of the support element 115 facing away from the clutch bell. In a hub area around the axis of rotation 110 (not shown) annular recesses are formed in the support element 115 to form the cylinders 410 as well as the contact areas 140 and 145. Radial projections 505 extend from the hub area to the securing points 135. One of the projections 505 comprises the hydraulic connector elements 150. The securing points 135 are not distributed evenly over the circumference, rather the angles are uneven between the neighboring securing points 135 with regards to the axis of rotation 110. This way, a rotational assembly position of the support element 115 with regards to the axis of rotation 110 is defined at the clutch bell 105.

Figures 6A, 6B:
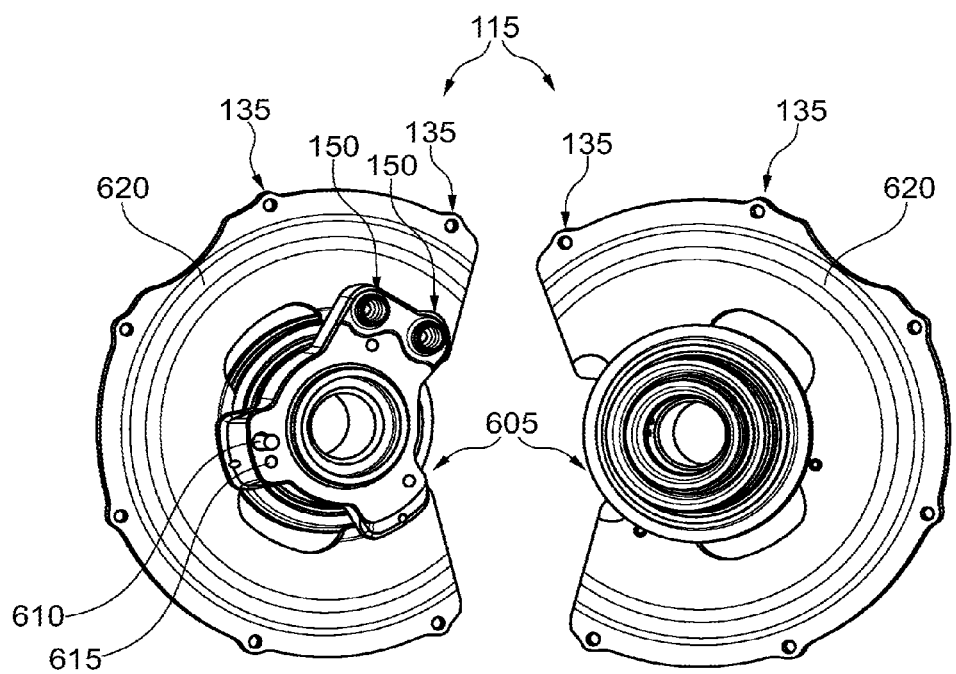
FIGS. 6A and 6B are perspective views of a support element of a release device in another embodiment.

FIGS. 6A and 6B show perspective views of the support element 115 of the release device 100 in another embodiment. In FIG. 6A a side of the support element 115 is shown facing the clutch bell 105, in FIG. 6B a side of the support element 115 facing away from the clutch bell 105. Contrary to the illustration of FIGS. 5A and 5B the support element 115 shown in FIGS. 6A and 6B comprises two elements, which are connected to each other. The first element is a hydraulic connection element 605, which is essentially equivalent to the support element 115 of FIG. 5 without any projections 505. Additionally, an alignment pin 610 is provided as well as bores 615 for accepting additional alignment pins, in order to define a rotationally unambiguous assembly position of the hydraulic connection element 605.

The support element 115 shown in FIGS. 6A and 6B comprises as the second element a connection element 620, which is connected to the connector element 605, for example via a press fit. The connection element 620 is essentially disk-shaped and may comprise one or more circumferential beads or grooves in order to improve the axial spring features of the connection element 620. For an improved illustration, in the left as well as the right area one section of the connection element 620 each is shown cut off. The securing points 135 are provided in a greater plurality than in the exemplary embodiment of FIGS. 5A and 5B, and may be distributed evenly over a circumference around the axis of rotation 110 (not shown).

LIST OF REFERENCE CHARACTERS

100 Release device
105 Clutch bell
110 Axis of rotation
115 Support element
120 First hydraulic actuator
125 Second hydraulic actuator
130 Clutch support
135 Securing points
140 Axial contact area of the support element
145 Radial contact area of the support element
150 Hydraulic connection
205 Axial contact area of the support element
210 Recess
215 Axial contact area of the clutch bell
220 Gap
305 Axial contact area of the clutch bell
310 Radial contact area of the clutch bell
405 First channel
410 Cylinder
415 Piston
420 Second channel
505 Extension
605 Hydraulic connector element
610 Alignment pin
615 Bore
620 Connection element

The invention claimed is:

1. A release device for a friction clutch, comprising:
   an actuator for axially operating the friction clutch, the actuator being hydraulically operable via fluid;
   at least one support element with integrated securing points for supporting the actuator on a clutch bell;
   the support element is embodied in one piece with a housing of the release device;
   the support element comprising a radially inner contact area for contacting the clutch bell and axial connections including hydraulic fluid ports located radially between the radially inner contact area and the integrated securing points;
   the integrated securing points are axially separated each by a predetermined gap from the clutch bell when the radially inner contact area contacts the clutch bell such that the support element by approaching securing points of the clutch bell is axially pre-stressed at the clutch bell in order to connect the axial connections of the support element with the clutch bell in a fluid-tight fashion.

2. A release device according to claim 1, wherein radial distances of the integrated securing points from an axis of rotation of the friction clutch are located outside a radial circumference of the friction clutch.

3. A release device according to claim 1, further comprising an alignment device to ensure an unambiguous rotational installation position of the support element.

4. A release device according to claim 1, wherein two adjacent angles between the integrated securing points are different from each other with regards to an axis of rotation.

5. A release device according to claim 1, wherein the radially inner contact area contacts the clutch bell in an area of an axis of rotation in order to ensure a centering of the release device with regards to the clutch bell.

6. A release device for a friction clutch, comprising:
   an actuator for axially operating the friction clutch, the actuator is hydraulically operable via hydraulic fluid;
   a support element with integrated securing points to support the actuator on a clutch bell, the integrated securing points are separated by a predetermined gap from the clutch bell when a radially inner contact area of the support element contacts the clutch bell such that the support element by approaching securing points of the clutch bell is axially pre-stressed at the clutch bell; and
   an axial connection is provided in the support element for the hydraulic fluid, and the integrated securing points provide a fluid-tight connection between the support element and the clutch bell.

7. A release device according to claim 6, wherein the release device is operable to release an additional friction clutch independent from the friction clutch, and the support element comprising another axial connection for fluid.

8. A release device according to claim 6, wherein the support element comprises a hydraulic connector element to accept the axial connections and an essentially disk-shaped connection element, fastened at the connector element, for fastening at the clutch bell.

* * * * *